(12) United States Patent
Pearson

(10) Patent No.: US 8,576,083 B2
(45) Date of Patent: Nov. 5, 2013

(54) RAIN DETECTOR

(75) Inventor: David Pearson, Troy, MI (US)

(73) Assignee: Enterprise Electronics, LLC, Rochester Hills, MI (US)

( * ) Notice: Subject to any disclaimer, the term of this patent is extended or adjusted under 35 U.S.C. 154(b) by 203 days.

(21) Appl. No.: 12/963,728

(22) Filed: Dec. 9, 2010

(65) Prior Publication Data

US 2011/0138567 A1 Jun. 16, 2011

Related U.S. Application Data

(60) Provisional application No. 61/285,291, filed on Dec. 10, 2009.

(51) Int. Cl.
*G08B 21/00* (2006.01)
(52) U.S. Cl.
USPC ........ 340/602; 340/601; 318/483; 73/170.17; 73/170.21
(58) Field of Classification Search
USPC .......... 340/602, 601, 604; 73/170.17, 170.21; 362/459; 324/658, 664, 71.5; 15/250.12, 250.001; 318/483
See application file for complete search history.

(56) References Cited

U.S. PATENT DOCUMENTS

| | | | | |
|---|---|---|---|---|
| 3,866,202 A | * | 2/1975 | Reiss et al. | 340/511 |
| 4,567,412 A | * | 1/1986 | Graham | 318/483 |
| 4,918,591 A | * | 4/1990 | Link | 363/39 |
| 4,933,559 A | * | 6/1990 | Tamura et al. | 250/338.3 |
| 5,402,075 A | * | 3/1995 | Lu et al. | 324/664 |
| 6,094,981 A | * | 8/2000 | Hochstein | 73/170.17 |
| 7,208,962 B2 | * | 4/2007 | Sun et al. | 324/690 |
| 7,446,427 B2 | * | 11/2008 | Parker et al. | 307/10.1 |
| 7,551,094 B2 | * | 6/2009 | Veerasamy | 340/602 |
| 2001/0038335 A1 | * | 11/2001 | Hog | 340/601 |
| 2002/0189329 A1 | * | 12/2002 | Wimmer | 73/73 |
| 2005/0125083 A1 | * | 6/2005 | Kiko | 700/19 |
| 2006/0290521 A1 | * | 12/2006 | Sun et al. | 340/576 |
| 2007/0157720 A1 | * | 7/2007 | Veerasamy | 73/170.17 |
| 2008/0223127 A1 | * | 9/2008 | Schmitt et al. | 73/170.17 |
| 2008/0225395 A1 | * | 9/2008 | Veerasamy | 359/601 |
| 2008/0290865 A1 | * | 11/2008 | Fujita et al. | 324/230 |
| 2009/0126476 A1 | * | 5/2009 | Veerasamy | 73/170.17 |
| 2009/0165550 A1 | * | 7/2009 | Veerasamy | 73/170.17 |
| 2009/0223288 A1 | * | 9/2009 | Veerasamy | 73/170.17 |
| 2010/0266832 A1 | * | 10/2010 | Derda | 428/292.1 |
| 2010/0277185 A1 | * | 11/2010 | Hughes | 324/664 |
| 2010/0289506 A1 | * | 11/2010 | Moon | 324/681 |
| 2011/0138567 A1 | * | 6/2011 | Pearson | 15/250.12 |
| 2011/0282660 A1 | * | 11/2011 | Hetherington et al. | 704/226 |

* cited by examiner

*Primary Examiner* — Hoi Lau
(74) *Attorney, Agent, or Firm* — Gifford, Krass, Sprinkle, Anderson & Citkowski, P.C.

(57) ABSTRACT

A rain detector for use with an automotive vehicle. The rain detector includes a capacitance sensor mounted to the inside surface of a windshield. The sensor includes at least two output lines which vary in capacitance as the function of magnitude of rain on the outside surface of the windshield. A programmed microcontroller receives the sensor output lines as analog input signals and then compares the magnitude of the capacitance with a threshold capacitance. In the event that the sensed capacitance exceeds the threshold capacitance, indicative of raindrops on the outside surface of the windshield, the microcontroller generates an output signal to the wiper control circuitry of the vehicle to activate the windshield wiper system.

6 Claims, 4 Drawing Sheets

RAIN DETECTOR

CROSS REFERENCE TO RELATED APPLICATIONS

This application claims priority of U.S. Provisional Patent Application Ser. No. 61/285,291 filed Dec. 10, 2009, which is incorporated herein by reference.

BACKGROUND OF THE INVENTION

I. Field of the Invention

The present invention relates to a rain detector for an automotive vehicle.

II. Description of Related Art

Essentially all automotive vehicles sold today include a windshield wiper system. The windshield wiper system typically includes a windshield wiper control circuitry which controls not only the activation of the windshield wipers, but also the speed of the windshield wipers. Furthermore, for intermittent windshield wipers, the control circuit determines the time period of the pause between sequential wipes of the windshield wipers.

In order to control the speed, as well as the pause between wipes for intermittent windshield wipers, a manual control is usually placed in the passenger compartment in a position accessible to the driver of the vehicle. Consequently, in order for the driver to not only activate the windshield wiper system, but also to control the speed of the windshield wipers and/or the amount of the pause between intermittent wipes of the windshield wiper, the driver must make the appropriate adjustment to the wiper control in the passenger compartment. Such adjustments, however, are distracting to the driver and can even result in a safety hazard for the driver and vehicle.

In order to eliminate the distraction of the driver which occurs during manual adjustment of the windshield wiper control, there have been previously known automatic windshield wiper systems. These automatic windshield wiper systems sensed the amount of rain on the windshield and then activated the windshield wiper system as required to clear the rain from the windshield. These previously known rain detector systems typically utilized optical processing techniques to detect the presence and density of raindrops on a selected portion of the windshield. While these previously known systems have operated satisfactorily, the prior systems require a fairly high degree of computational capability which not only results in increased cost for the rain detector system, but also power consumption by the rain detector. Consequently, these previously known rain detector systems for automotive vehicles have not enjoyed widespread acceptance, particularly for medium priced and economy priced vehicles.

SUMMARY OF THE PRESENT INVENTION

The present invention provides a rain detector which overcomes the above-mentioned disadvantages of the previously known systems.

In brief, the rain detector of the present invention comprises a capacitance sensor which is attached to the inside surface of the windshield so that the capacitance sensor covers a portion of the windshield. The capacitance sensor may be of any construction, but preferably comprises a polymeric sheet having at least two conductive traces formed on the sheet. These conductive traces are positioned closely adjacent, but electrically isolated, from each other.

Both electrical traces are coupled as separate analog inputs to a programmed microcontroller. The programmed microcontroller, by utilizing a variable frequency internal clock which periodically charges a resistor-capacitor network externally of the microcontroller, determines the magnitude of capacitance between the two traces on the sensor. When the capacitance between the two traces on the sensor exceeds a threshold amount, the microcontroller generates an output signal to the wiper control circuitry to activate the windshield wipers for the automotive vehicle. Access to the wiper control circuitry for the microcontroller may be gained either directly or through the vehicle control harness or control bus.

In operation, as raindrops begin to impact on the outside surface of the windshield wiper, the capacitance between the two traces on the polymeric substrate increases due to the conductivity of the water. This conductivity effectively forms a pair of series capacitors between the first conductive trace on the sensor and the rain on the outside surface of the windshield, and the rain on the outside surface of the windshield and the other conductive trace. As the amount of rain increases, so does the capacitance. The wiper controller is then programmed to generate the appropriate output signal to the windshield wiper control circuit to control not only the speed of the windshield wipers, but also the duration of the pause during intermittent operation.

In a second embodiment of the invention, the sensor includes an array of conductive pads, each associated with a ground line. The conductive pads are then electrically connected as input signals to the microcontroller, preferably by a row and column arrangement. The microprocessor is then programmed to count the number of raindrops on the sensor at any given time by examining the capacitance of each element of the array in order to determine the number of raindrops on the sensor at a given time. The microcontroller then generates an output signal to the windshield wiper control circuit which varies as a function of the number of raindrops on the sensor. Consequently, as the number of raindrops on the outside surface of the windshield aligned with the sensor increases, so does the output signal to the windshield wiper control circuit which, in turn, increases the speed of the windshield wipers.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF PREFERRED EMBODIMENTS OF THE PRESENT INVENTION

Figure 1:
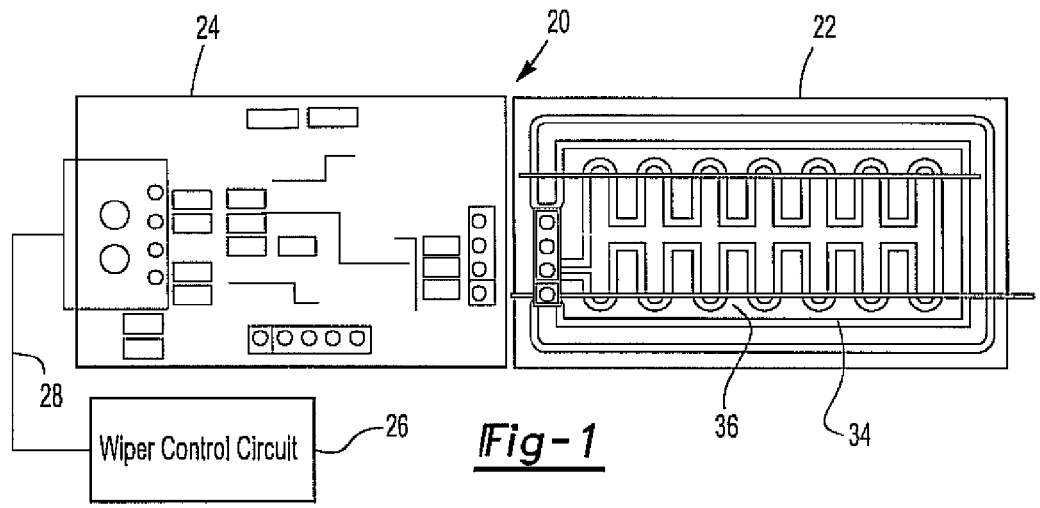
FIG. 1 is a plan view illustrating an exemplary first embodiment of a preferred rain detector of the present invention.

With reference first to FIG. 1, a first embodiment of a rain detector 20 in accordance with the present invention is illustrated. The rain detector 20 includes a capacitance sensor 22 which is electrically connected to the rain detector control circuitry 24. Although the rain detector circuitry 24 is illustrated in FIG. 1 as immediately adjacent the sensor 22, it will be understood that the circuitry or printed circuit board 24 may be positioned at a distance from the sensor 22 and connected to the sensor 22 by the appropriate cable.

The circuitry or printed circuit board 24 for the rain detector 20 is in turn connected to a wiper control circuit 26 in an automotive vehicle. Although any conventional means may be used to connect the circuit 24 to the wiper control circuit 26, preferably a circuit board 24 is electrically connected to the wiper control circuit 26 through the vehicle control wiring harness 28.

Figure 2:
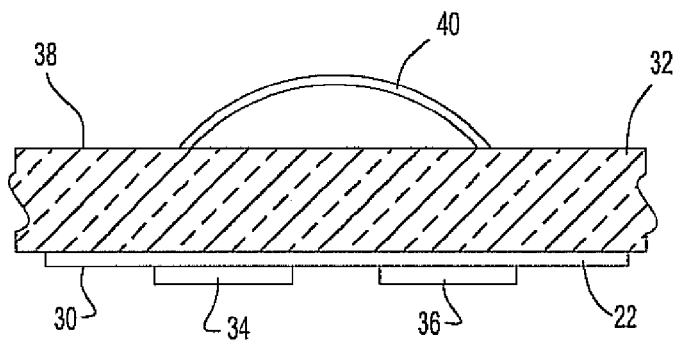
FIG. 2 is a fragmentary view of the sensor attached to a vehicle windshield.

With reference now to FIGS. 1 and 2, the capacitance sensor 22 includes a flexible substrate 30 preferably made of a polymeric material such as Mylar, polystyrene, polyethylene, etc. Preferably, the substrate 30 is transparent.

As best shown in FIG. 2, the substrate 30 is mounted on a portion of an automotive windshield 32 so that the sensor substrate 30 covers a known area of the windshield 32. For example, a relatively small area of the windshield 32 adjacent the rearview mirror in the vehicle provides a convenient position for the sensor 22 without unduly obstructing the driver's vision.

Referring again to FIGS. 1 and 2, at least two conductive strips 34 and 36 are contained on the substrate 30 such that the conductive strips or traces 34 and 36 are positioned closely adjacent each other, but are electrically isolated from each other. These traces 34 and 36 may also be formed in a pattern as shown in FIG. 1 which effectively increases the area between the two conductive traces 34 and 36.

With reference to FIG. 2, in the absence of rain on an outer surface 38 of the windshield 32, a relatively small amount of capacitance is exhibited between the conductive traces 34 and 36. However, in the event that a raindrop 40 collects on the outside surface 38 of the windshield 32 in alignment with the capacitance sensor 22, the raindrop 40, which is electrically conductive, effectively and dramatically increases the capacitance between the two conductive traces 34 and 36. In essence, a raindrop 40 creates a temporary series combination of two capacitors, i.e. the first capacitor between the conductive trace 34 and the raindrop 40, and the second capacitor between the raindrop 40 and the conductive trace 36.

It will be understood, of course, that as the amount or number of raindrops accumulate on the outside surface 38 of the windshield 32 in alignment with the capacitance sensor 22, the overall capacity between the two conductive traces 34 and 36 increases. Consequently, the capacitance between the two conductive traces 34 and 36 is proportional to the windshield wiper speed necessary to remove moisture from the outside surface 38 of the windshield 32.

Figure 3:
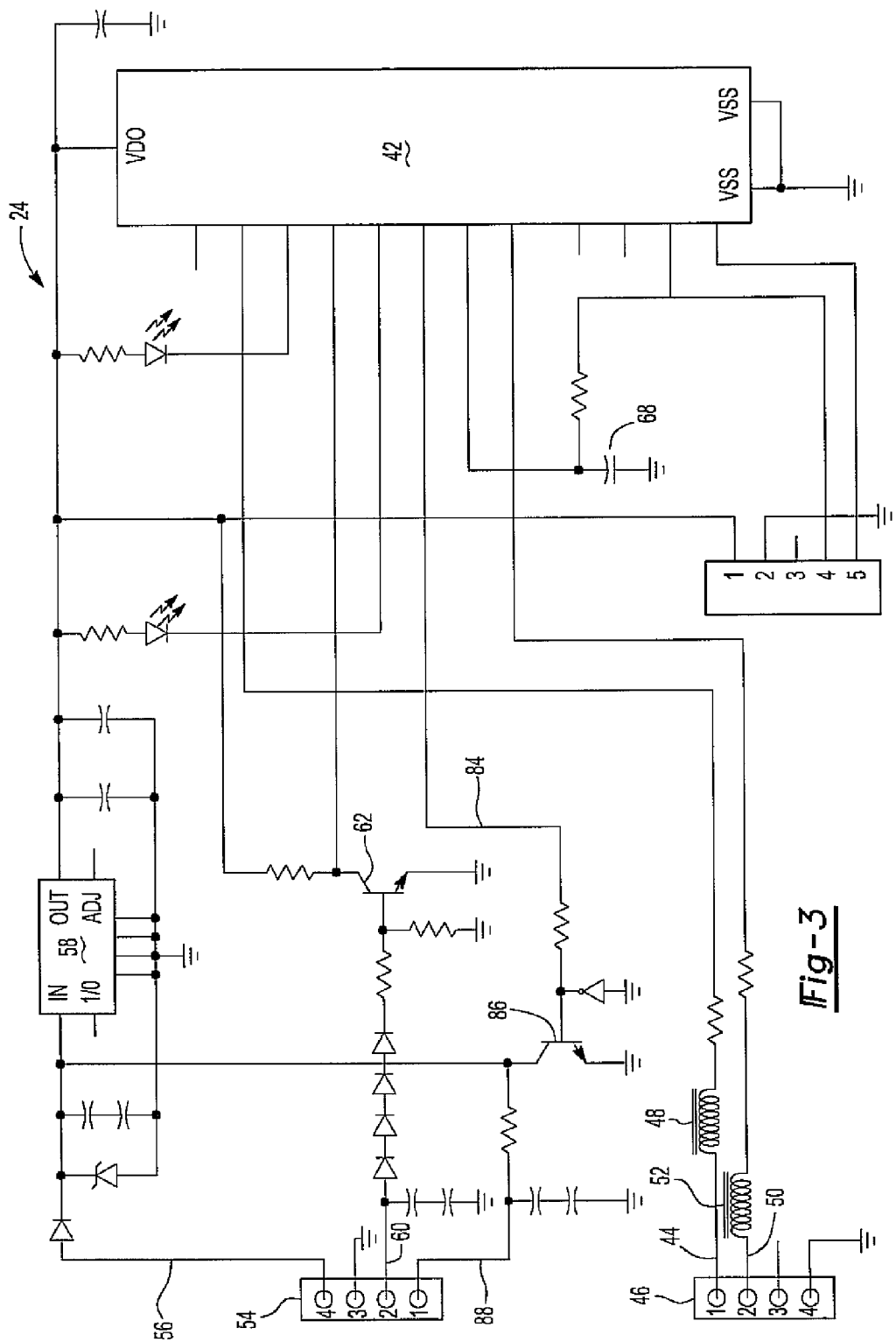
FIG. 3 is a schematic diagram of the circuit used in conjunction with the first embodiment of the present invention.

With reference now to FIG. 3, a first embodiment of the control circuit 24 for the rain detector is illustrated. The circuit 24 includes a programmed microcontroller 42. In the preferred embodiment of the invention, a Cypress CY8C21234 microcontroller 42 is utilized in the circuit 24, although other microcontrollers, oftentimes called PICs, may be used without deviation from the spirit or scope of the invention.

The first metal trace 34 is electrically connected to an input line 44 attached to a connector 46 on the circuit 24. This input is coupled through an inductor 48, which merely blocks radiofrequency signals, to an input port on the microcontroller 42. Similarly, the second trace 36 is electrically connected to an input line 50 on the connector 46. This input line 50 is also coupled through an inductor 52 which blocks RF radiation to an input port on the microcontroller 42.

Still referring to FIG. 3, a second connector 54 in the circuit 24 is electrically connected to the vehicle harness 28. The vehicle harness provides power through line 56 to a voltage regulator 58 which provides the proper regulated voltage to the microcontroller 42. Additionally, a further line 60 from the connector 54 provides an input signal to the microcontroller 42 that automatic regulation of the windshield wiper system is desired. For example, when line 60 goes high, transistor 62 conducts which sends a low digital signal to a port pin on the microcontroller 42.

A resistor-capacitor charging network 66 is also electrically connected between two port pins on the microcontroller 42. This RC network 66 is utilized by the microcontroller 42 to determine the capacitance sensed between the two input lines 44 and 50.

Figure 4:
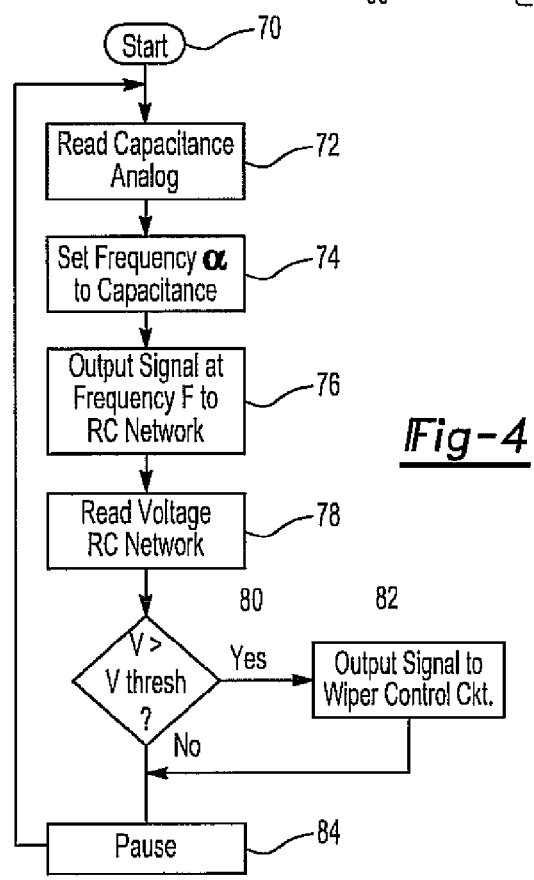
FIG. 4 is a flowchart illustrating an exemplary operation of the present invention.

With reference now to FIG. 4, a flowchart is shown illustrating the operation of the rain detector of the present invention. After initiation of the rain detector circuit 24 after receiving a signal on line 60 at step 70, step 70 proceeds to step 72. At step 72 the microcontroller 42 utilizes the amount of capacitance on the input lines 44 and 50 which are in turn connected to the conductive traces 34 and 36 on the sensor 22 onto input port pins. Step 72 then proceeds to step 74 where the microcontroller 42 varies the frequency of an internal clock in an amount proportional to the capacitance sensed on its two input port pins connected to lines 44 and 50. Although any algorithm may be used, in the preferred embodiment of the invention, the frequency of the internal clock of the microcontroller 42 increases in an amount proportional to the capacitance sensed by input lines 44 and 50. Step 74 then proceeds to step 76.

At step 76, the microcontroller 42 outputs the frequency of its internal clock to the RC network 66 for a predetermined time interval. At the end of that time interval, step 76 proceeds to step 78. At step 78, the microcontroller 42 reads the voltage accumulated on the RC network 66. This voltage, furthermore, will increase in an amount proportional to the capacitance on lines 44 and 50 and thus proportional to the amount of rain accumulated on the outside surface 38 of the windshield 32 in alignment with the sensor 22. Step 78 then proceeds to step 80. At step 80, the microcontroller compares the voltage on the RC network 66 with a predetermined threshold voltage $V_{THRES}$. If the voltage exceeds the threshold voltage $V_{THRESH}$, step 80 branches to step 82 whereupon the microcontroller 42 (FIG. 3) generates an output signal on a line 84 which is electrically connected to an output port pin. The line 84 is also coupled to the base of a transistor 86 which pulls an output line 88 electrically connected to the wiper control circuit 26 (FIG. 1) through the connector 54 to a low state. Furthermore, a signal generated to the base of the transistor 86 by the microcontroller 42 is a pulse width modulated signal in which the duration of the pulses increases in an amount proportional to the capacitance between the input lines 44 and 50 and thus proportional to the magnitude of the rainfall.

Referring again to FIG. 4, in the event that the measured voltage on the RC network 66 is less than the threshold $V_{THRESH}$, step 80 instead branches directly to step 84. Step 84 creates a pause in the overall operation of the program and then branches back to step 72 where the above-described process is repeated.

Figure 5:
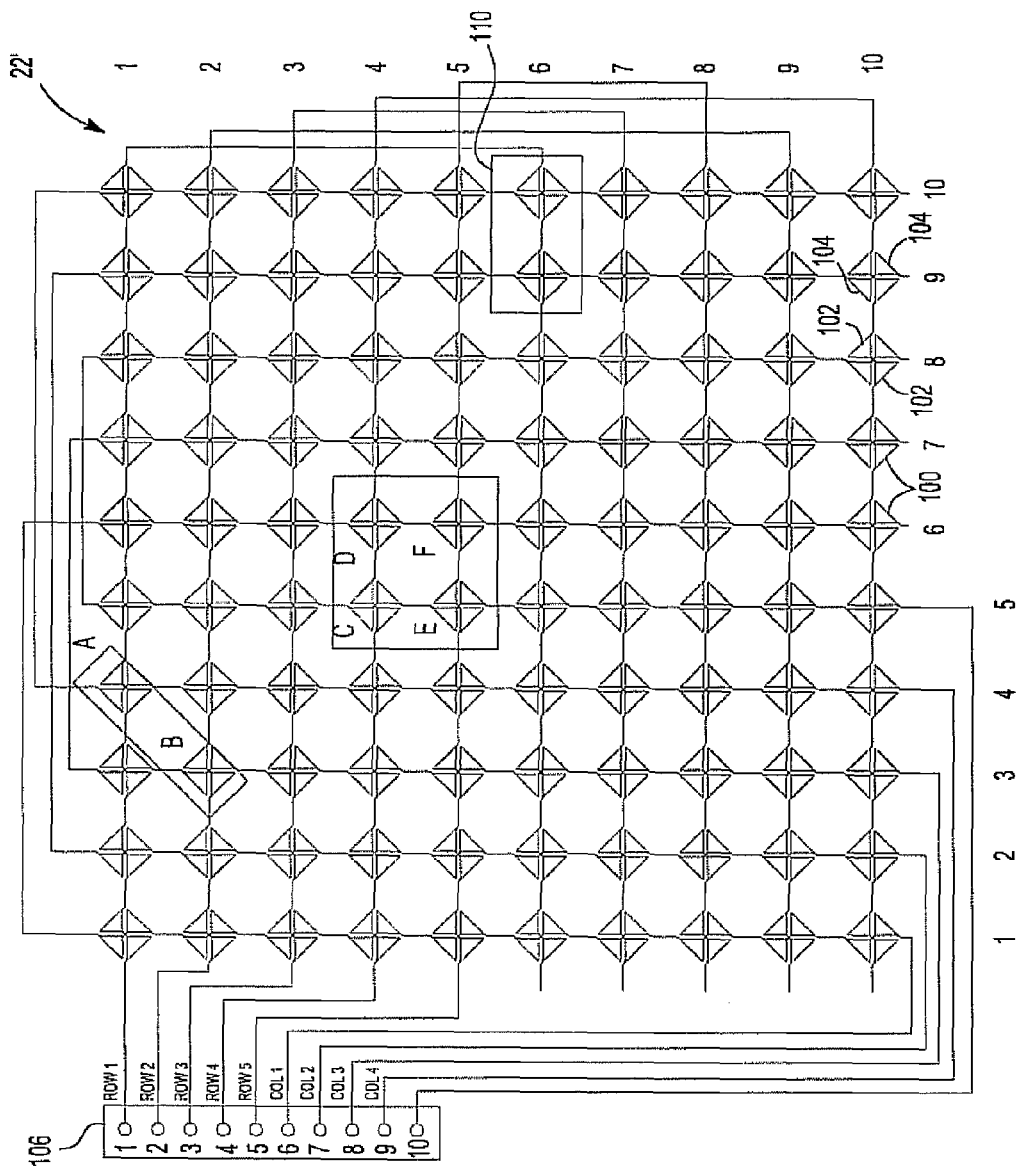
FIG. 5 is a plan view illustrating a second type of sensor and enlarged for clarity.

With reference now to FIG. 5, a modification of the present invention is shown in which the capacitance sensor 22' is formed as an array of conductive pads 100 arranged in linear rows and columns. Each pad 100, furthermore, includes a first portion which is electrically connected to a conductive trace extending through its row, and a second portion 104 which is electrically connected to a trace extending through its column. All of the portions 102 in the same row are electrically connected to each other and, similarly, all of the portions 104 in each column are electrically connected together.

As illustrated in FIG. 5, the overall array of the conductive pads 100 includes ten rows and ten columns. Furthermore, a single conductive line extends through two rows or two columns for each of the ten output pins on an output connector 106 for the sensor 22'.

Still referring to FIG. 5, the electrical connection between the various columns and rows of the pads 100 on the sensor 22' is arranged so that two adjacent columns in columns 1-5 are not connected to two adjacent columns in columns 6-10. For example, columns 1 and 6 are electrically connected together and to pin 1 on the connector 106. Columns 2 and 9 are also electrically connected together and connected to pin 2 on the connector 106. However, the columns 6 and 9 are not electrically adjacent each other. Similarly, columns 3 and 7 are electrically connected together so that, while columns 2 and 3 are electrically adjacent each other, columns 9 and 7 are not. The same is also true for all ten rows.

The advantage of connecting nonadjacent rows together and columns together as discussed above is that it permits the precise position of a raindrop to be identified on a 10 by 10 matrix utilizing only ten pins. For example, a raindrop 110 which overlies the conductive pads on columns 9 and 10, row 6 provides an absolutely unique output signal on the pins for the connector 106 which will not be replicated by a raindrop overlapping two conductive pads 100 anywhere else on the sensor array.

Figure 6:
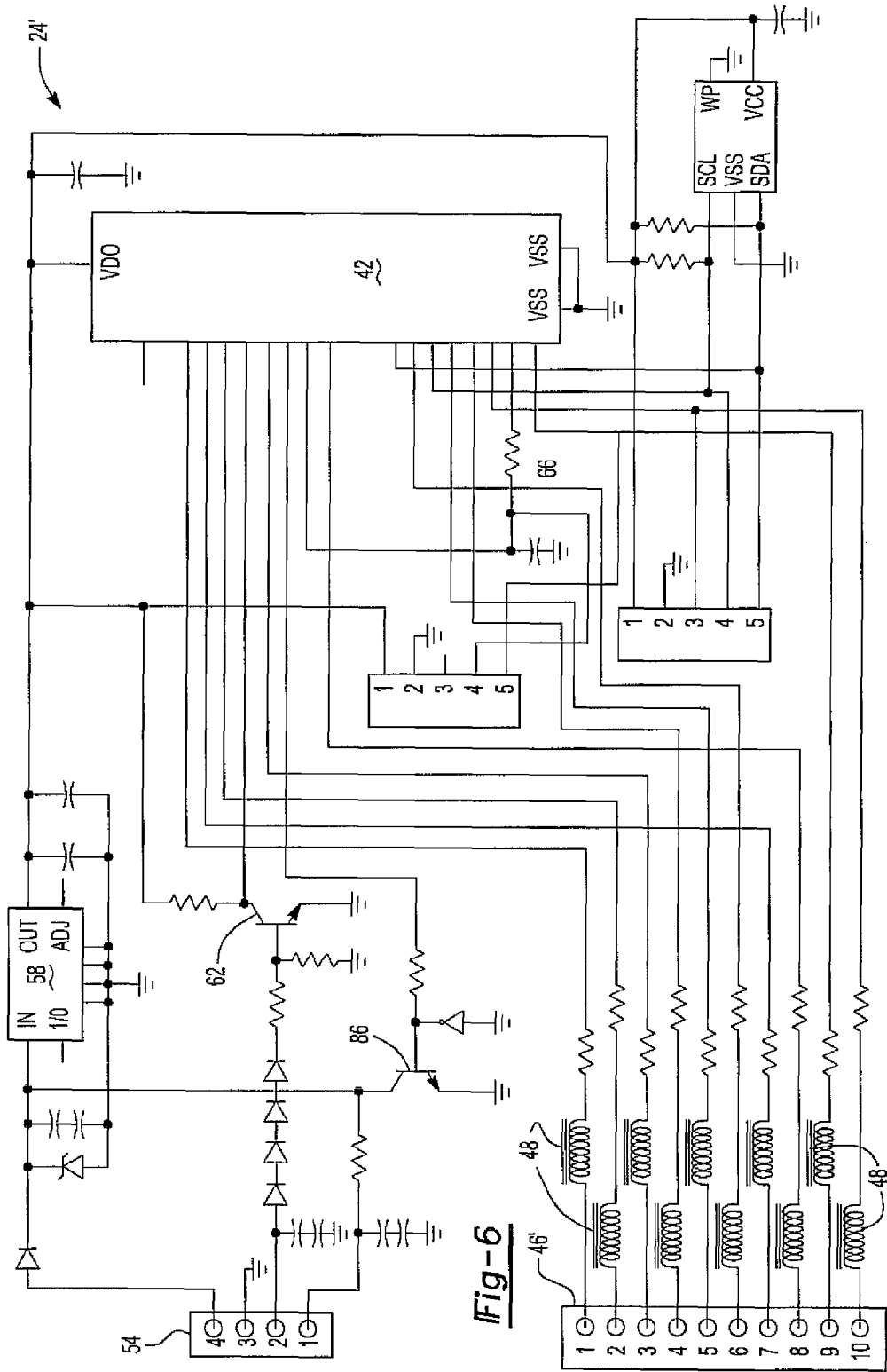
FIG. 6 is a schematic view illustrating the circuitry used in conjunction with the sensor of FIG. 5.

With reference now to FIG. 6, a circuit for use with the rain detector illustrated in FIG. 5 is shown. The circuit 24' in FIG. 6 is similar to the circuit 24 of FIG. 3, except that the connector 46' from the sensor 22' includes ten pins rather than two or three pins. The connector 46' is connected to the connector 106 (FIG. 5) by the appropriate connector, such as a ribbon connector.

As before, inductors 48 are connected in series with each of the pins on the connector 46 to block RF radiation. Each input line from the connector 46' is also connected to an input port pin on the microcontroller 42.

The microcontroller 42 is also powered through the voltage regulator 58 and is also connected to the vehicle harness and wiper control circuit 26 in the same fashion as previously described. As such, a further description thereof is unnecessary.

Unlike the previously known circuit illustrated in FIG. 3, in the circuit illustrated in FIG. 6, the microcontroller 42 is programmed to count the number of raindrops aligned with the sensor 22' during a predetermined time period. The microcontroller 42 utilizes that count to adjust the frequency of its internal clock and the charging of the RC network 66. The voltage on the RC network 66 at the end of the charging period is then used to provide a PWM signal to the wiper control circuitry 26 in which the pulse width varies as a function of the number of raindrops counted.

From the foregoing, it can be seen that the present invention provides a simple and yet unique raindrop detector for use in automotive applications. Having described my invention, however, many modifications thereto will become apparent to those skilled in the art to which it pertains without deviation from the spirit of the invention as defined by the scope of the appended claims.

I claim:

1. A rain detector used in conjunction with a windshield with an inside and an outside surface comprising:
    a capacitance sensor adapted for attachment to the inside surface of the windshield, said sensor having at least two output lines which vary in capacitance as a function of the magnitude of rain on the outside surface of the windshield aligned with the sensor,
    a programmed microcontroller which receives the magnitude of the capacitance on the sensor output lines as input signals and generates an output signal which varies in frequency in an amount proportional to the magnitude of capacitance on the sensor output lines,
    an RC network electrically connected to said microcontroller,
    said variable frequency output signal connected as an input signal to said RC network for a predetermined time period, said microcontroller being programmed to determine a voltage on said RC network at the end of said predetermined time period and to generate a wiper activation output signal only whenever said voltage exceeds a predetermined threshold, and
    a wiper control circuit which receives the microcontroller wiper activation output signal as an input signal, said wiper control circuit activating at least one wiper for the windshield in response to said wiper activation signal.

2. The rain detector as defined in claim 1 and comprising an inductor connected in series with at least one sensor output line, said inductor attenuating radio frequency interference on its associated sensor output line.

3. The rain detector as defined in claim 1 and comprising an inductor connected in series with each one sensor output line, said inductor attenuating radio frequency interference on its associated sensor output line.

4. The rain detector as defined in claim 1 wherein said sensor comprises an array of conductive pads arranged in rows and columns, a plurality of rows and a plurality of columns each connected to individual inputs of said microcontroller.

5. The rain detector as defined in claim 4 wherein two rows or two columns are connected to each sensor input line of the microcontroller.

6. The rain detector as defined in claim 1 wherein said sensor comprises a pair of conductive traces arranged on a nonconductive substrate, said traces being adjacent but spaced apart from each other.

* * * * *